(12) United States Patent
Christy et al.

(10) Patent No.: US 7,416,673 B2
(45) Date of Patent: Aug. 26, 2008

(54) METHOD AND APPARATUS FOR TREATING LIME SLURRY FOR GRIT REMOVAL

(75) Inventors: Paul G. Christy, Malvern, PA (US); Michael Quici, Ambler, PA (US)

(73) Assignee: RDP Company, Norristown, PA (US)

( * ) Notice: Subject to any disclaimer, the term of this patent is extended or adjusted under 35 U.S.C. 154(b) by 39 days.

(21) Appl. No.: 11/278,233

(22) Filed: Mar. 31, 2006

(65) Prior Publication Data
US 2006/0231511 A1 Oct. 19, 2006

Related U.S. Application Data

(63) Continuation-in-part of application No. 11/106,068, filed on Apr. 14, 2005.

(51) Int. Cl.
*B01D 21/02* (2006.01)
(52) U.S. Cl. .................. 210/800; 210/805; 423/640
(58) Field of Classification Search .................. None
See application file for complete search history.

(56) References Cited

U.S. PATENT DOCUMENTS

| | | | |
|---|---|---|---|
| 2,904,401 A | 9/1959 | Booth | |
| 3,170,770 A | 2/1965 | Bousman et al. | |
| 3,573,002 A * | 3/1971 | Zimmerman et al. | 422/162 |
| 3,942,379 A | 3/1976 | Kanzler | |
| 4,081,998 A | 4/1978 | Martig, Jr. | |
| 4,261,953 A | 4/1981 | Gisler | |
| 4,281,540 A | 8/1981 | Lee et al. | |
| 4,436,703 A * | 3/1984 | Lane | 422/225 |
| 4,482,528 A | 11/1984 | Emmett | |
| 4,547,349 A * | 10/1985 | Lane | 423/164 |
| 4,588,559 A | 5/1986 | Emmett | |
| 4,636,379 A | 1/1987 | Bestek et al. | |
| 4,906,130 A | 3/1990 | Manley, Jr. et al. | |
| 5,223,239 A | 6/1993 | Moran et al. | |
| 5,294,408 A * | 3/1994 | Muzik et al. | 422/162 |
| 5,336,481 A | 8/1994 | Muzik et al. | |
| 5,368,731 A | 11/1994 | Pesotini | |
| 5,413,635 A * | 5/1995 | Matweecha et al. | 106/792 |
| 5,492,685 A | 2/1996 | Moran et al. | |
| 5,792,440 A | 8/1998 | Huege | |
| 5,876,689 A | 3/1999 | Webeling et al. | |
| 5,951,161 A * | 9/1999 | Blagg | 366/152.6 |
| 5,965,103 A | 10/1999 | Golley et al. | |

(Continued)

FOREIGN PATENT DOCUMENTS

WO WO 2006113176 A2 * 10/2006

*Primary Examiner*—Robert James Popovics
(74) *Attorney, Agent, or Firm*—Paul & Paul

(57) ABSTRACT

A method and apparatus is provided for conveying lime slurry, removing and controlling the amount of grit, and feeding lime slurry, wherein the lime slurry moves through a recirculation loop, and wherein gravity removal of grit from the lime slurry takes place. A stilling well is provided, inside or outside the slurry tank, either fixed in cross-sectional area or adjustable, but wherein the cross-sectional area of the stilling tank can be selected or adjusted to alter the flow velocity of slurry therethrough and the residence time of slurry therethrough, as slurry is delivered through the stilling well via a suction line located therein, whereby grit can be separated via gravity from slurry in the slurry tank prior to withdrawal of slurry through the stilling well.

6 Claims, 6 Drawing Sheets

U.S. PATENT DOCUMENTS 5,997,823 A * 12/1999 Haslbeck .................... 422/169
6,451,281 B1    9/2002 Ebeling et al.
6,568,842 B1 *  5/2003 Murray ....................... 366/137
2006/0231507 A1 * 10/2006 Christy et al. ............... 210/767
2006/0231511 A1 * 10/2006 Christy et al. ............... 210/800
2008/0131358 A1 *  6/2008 Woida et al. ................ 423/637

* cited by examiner

METHOD AND APPARATUS FOR TREATING LIME SLURRY FOR GRIT REMOVAL

CROSS-REFERENCE TO RELATED APPLICATION

This application is a continuation-in-part of U.S. application Ser. No. 11/106,068 filed Apr. 14, 2005.

BACKGROUND OF THE INVENTION

Lime has been found to have many uses. Such uses have included the treatment of sewage sludge to remove pathogens, lime stabilization of waste water, pasteurization of sludge and many other treatment processes.

Examples of such processes involving use of lime include U.S. Pat. Nos. 5,013,458; 5,186,840; 5,405,536; 5,554,279 and 5,681,481.

In many uses, lime in the form of calcium oxide (CaO) is mixed with water (H2O) to form calcium hydroxide (CaOH2). The chemical reaction which occurs during such mixing, gives off heat in the form of an exothermic reaction, and when done with excess water is commonly referred to as "lime slaking", a process which is accomplished in a device known as a lime slaker. The resulting mixture of lime (CaOH2) and water is known as a lime slurry. Lime slurries are known to have some unique properties, one of which is its inherent ability to form scale on surfaces which come into contact with the lime slurry. The formation of scale, or "scaling" can render the various delivery systems, such as pipes, troughs, conduits, etc. unusable over time due to the build-up of scale. Alternatively, such scale build-up can require frequent cleaning and descaling of the equipment that is used to handle lime slurries. Cleaning and descaling operations can be considerably labor intensive.

Lime slurries also contain a certain amount of inert material that is commonly referred to as grit. Grit results because the calcium oxide, generally in the form of quicklime (CaO) contains a certain amount of material other than CaO. Typically, lime contains approximately 90%-95% CaO, and 5%-10% inert material, or grit.

The presence of grit in a lime slurry can cause numerous problems, including grit build-up in downstream process chambers or vessels, grit acting to plug or clog nozzles and orifices through which the slurry passes, and abrasions caused to treatment equipment and slurry delivery equipment such as pumps, pipes, valves, etc. because of the abrasive nature of grit particles.

Various techniques have been attempted for separation of unwanted grit that is contained within a lime slurry.

For example, U.S. Pat. No. 4,482,528 describes some of the problems that are encountered when trying to separate unwanted grit from a lime slurry. For example, using a gravity classifier to separate grit from a lime slurry when discharging from a lime slaker, is described as being unable to effectively remove particles smaller than 100 mesh (140 microns).

The gravity separation of grit, directly after the slaking of lime in a lime slaking device can be problematic, in that the amount and size of the grit removed will vary as the rate of discharge from the lime slaker varies. At high discharge rates from the slaker, the slurry will have less retention time in the grit separation chamber, which can be insufficient for the smaller grit particles to settle, such that the grit particles can be conveyed through the separation chamber and into the finished lime slurry, resulting in inconsistent and highly variable amounts of grit removal.

U.S. Pat. No. 4,482,528 attempts to improve upon gravity separation of grit by the use of a cyclone followed by at least one gravity classifier device. The cyclone operates centrifugally, and removes grit and lime, which discharges from the cyclone into a gravity classifier, wherein dilution water is added in order to allow the grit to settle in the classifier.

SUMMARY OF INVENTION

The present invention provides a method and apparatus for removing unwanted grit from a lime slurry while allowing some grit to remain, without requiring multiple steps of cyclone separation plus gravity separation, and without requiring the use of dilution water in the process and therefore without introducing variations in slurry concentration to the resultant final slurry output.

Accordingly, it is a primary object of this invention to provide a novel method and apparatus for removing grit particles from a watery lime slurry during the process of delivering slurry from a slurry tank, whereby the slurry is substantially continuously delivered from the slurry tank to a grit separator, with a portion of the slurry being extracted for discharge, while the rest of the slurry is recirculated to the slurry tank after separation of some of the grit from the slurry.

It is a further object of this invention to accomplish the above object, wherein the separation of grit occurs in a gravity-operative grit classifier.

It is another object of this invention to accomplish the above objects, wherein the slurry that is extracted is done on a controlled basis.

It is a further object of this invention to accomplish the above objects, wherein the recirculation of slurry involves the serial flow of slurry from the slurry tank to the grit separation point, followed by a recirculation of the remaining slurry to the slurry tank.

It is another object of this invention, wherein grit is separated from a watery lime slurry, by the substantially continuous delivery of slurry to a grit separation point, and wherein the rest of the slurry is recirculated to the slurry tank, and wherein a parallel flow of slurry from the slurry tank provides for substantially continuous delivering of slurry.

Other objects and advantages of the present invention will be readily apparent upon a reading of the following brief descriptions of the drawing figures, the detailed descriptions of the preferred embodiments, and the appended claims.

BRIEF DESCRIPTION OF THE DRAWING FIGURES

FIG. 1 is a flow diagram illustrating delivery of lime to a slurry tank from a lime slaker, followed by the delivery of slurry from a slurry tank to an extraction site for some of the slurry, while the rest of the slurry is delivered to a separation device for separating some of the grit from the slurry, with the slurry then being recirculated to the slurry tank, wherein the flow of slurry from the slurry tank to the point of grit separation, followed by the recirculation of slurry from the grit separation point to the slurry tank, is serial.

Figure 6:
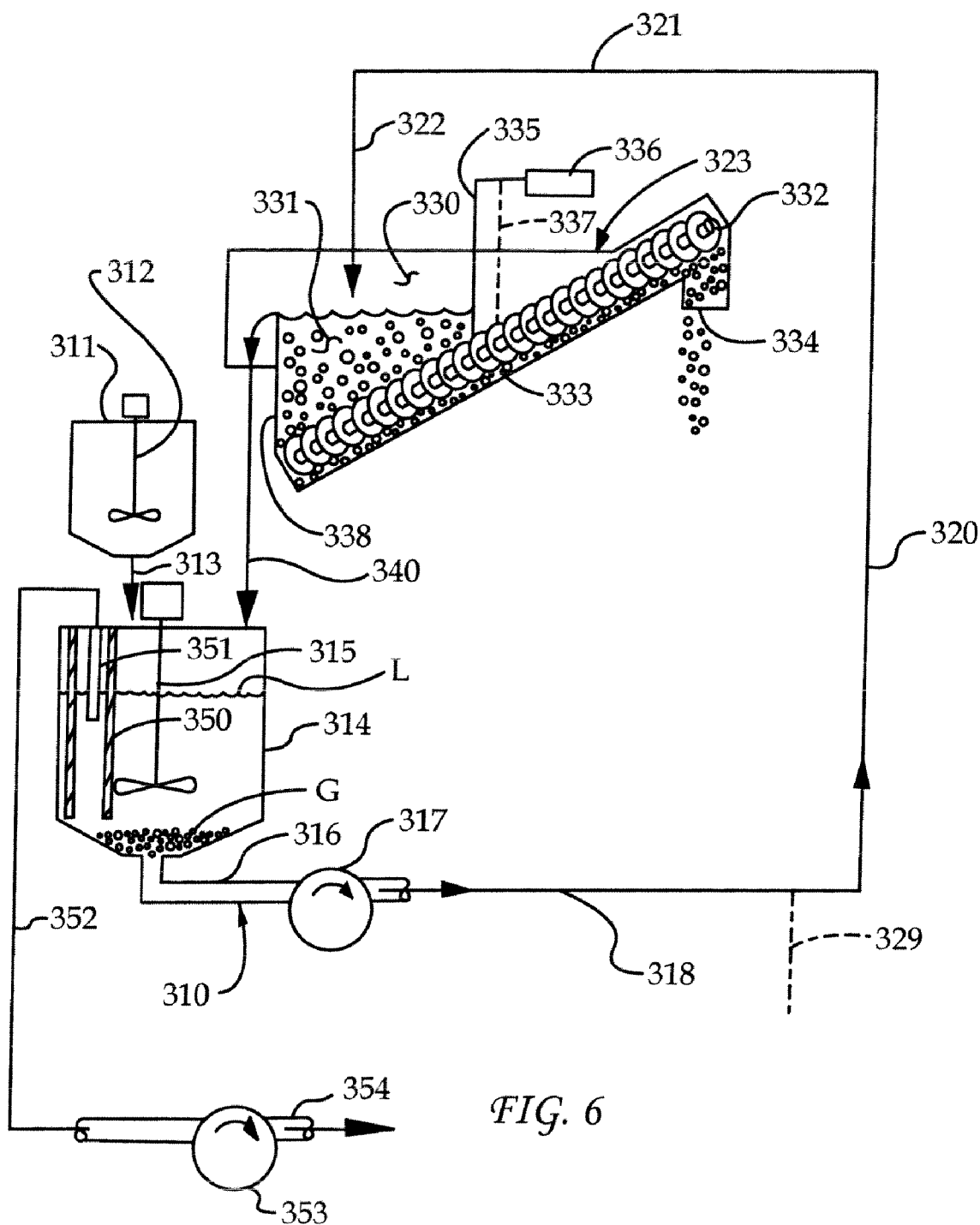
FIG. 6 is an illustration of a flow diagram of an alternative embodiment, somewhat similar to that of FIG. 2, but wherein the slurry is pumped from the slurry tank through a suction line, to discharge, through a stilling well.
Figure 7:
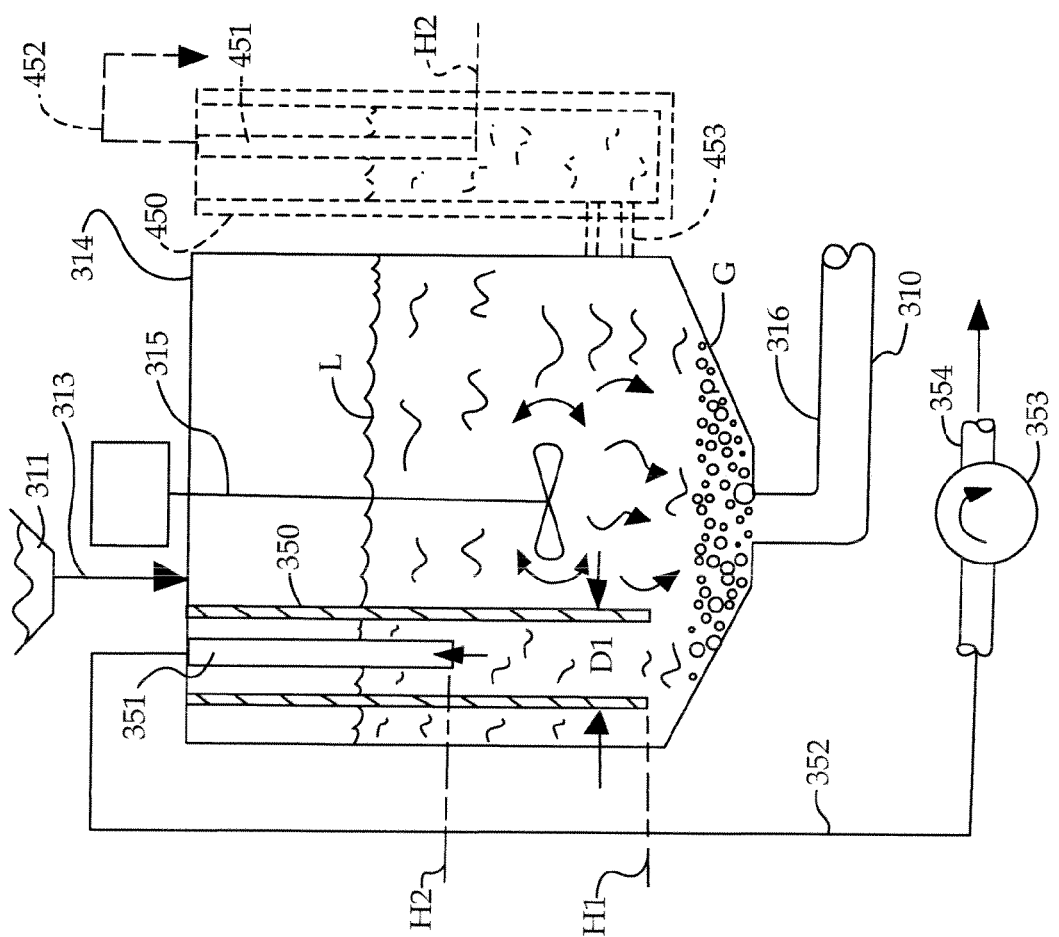

FIG. 7 is an enlarged, detailed view of the illustration of a portion of FIG. 6, showing a liquid level for the slurry in the tank, and wherein grit is illustrated as being separated out of the slurry in the slurry tank, and wherein slurry is discharged from the stilling well of FIG. 6, with FIG. 7 also illustrating in phantom an alternative placement for the stilling well that is outside the slurry tank, as distinguished from the stilling well shown inside the slurry tank in the full line illustration of FIG. 7.

Figure 8:
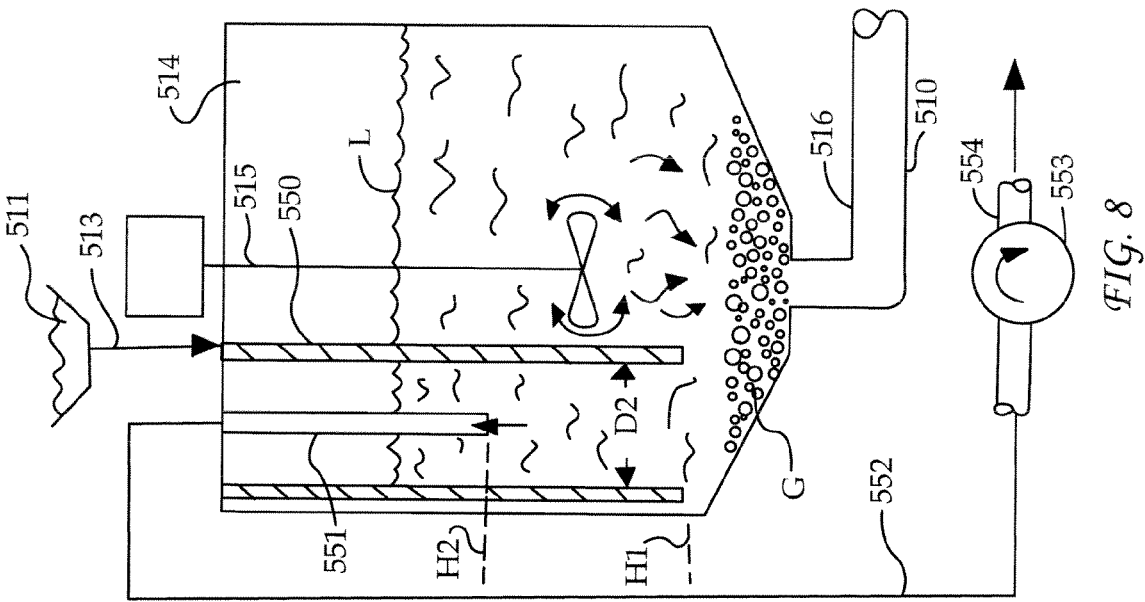

FIG. 8 is an illustration similar to that of FIG. 7, but wherein the diameter of the stilling well is greater than that of the stilling well illustrated in FIG. 7, illustrating an increased cross-sectional area for the stilling well for controlling the rise rate of the slurry in the stilling well prior to entering the suction line, so that grit that is subjected to turbulence in the slurry tank in the embodiment of FIG. 8, and wherein the flow velocity of slurry through the stilling well in FIG. 8 would be reduced from that of a stilling well of lesser cross-section as illustrated in FIG. 7, whereby increased residence time of slurry in the stilling well takes place in the embodiment of FIG. 8, relative to the residence time of slurry in the bottom of the stilling well of FIG. 7.

Figure 9:
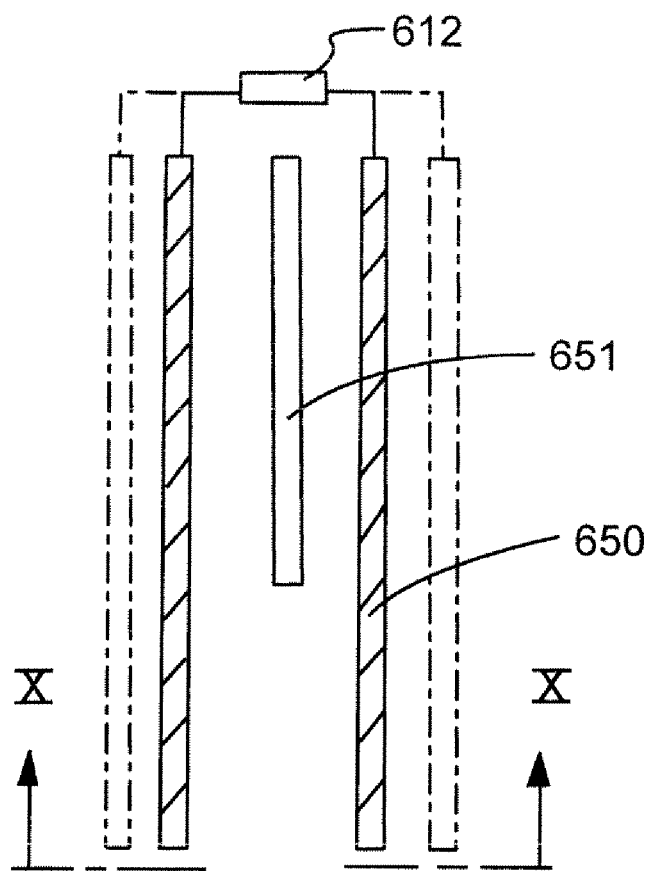

FIG. 9 is a vertical view of an alternative embodiment of a stilling well that is adjustable in cross-section.

Figure 10:
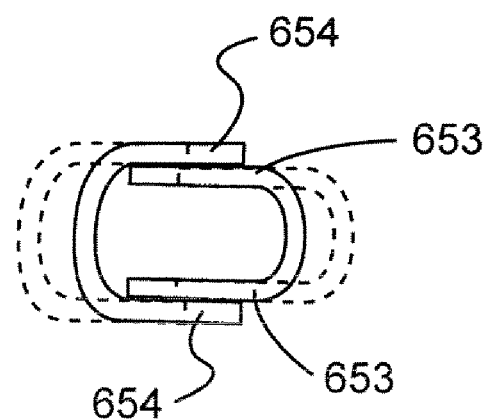

FIG. 10 is an end view of the stilling well of FIG. 9, taken along the line X-X of FIG. 9.

DETAILED DESCRIPTIONS OF THE PREFERRED EMBODIMENTS

Figure 1:
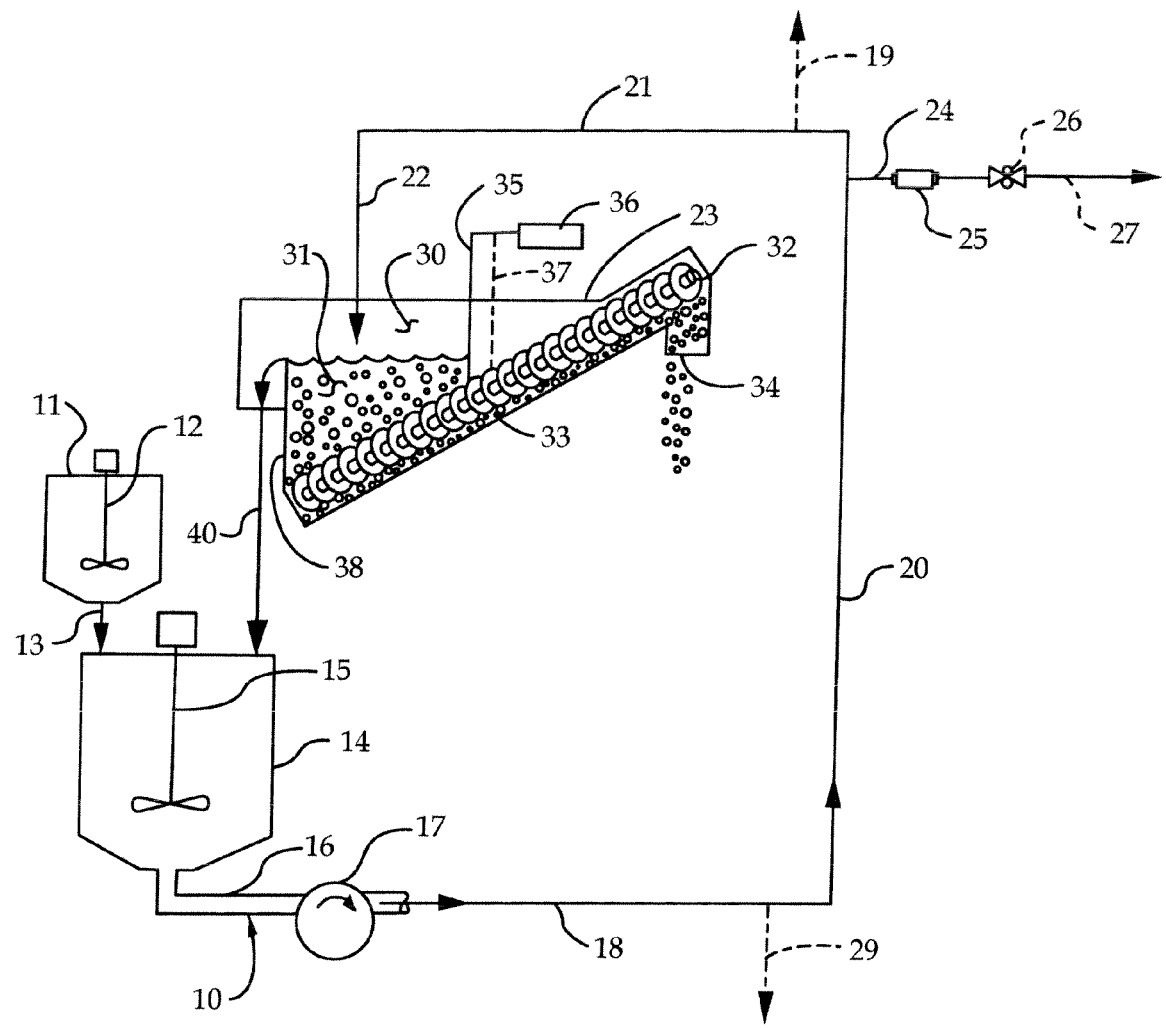

Referring now to the drawings in detail, reference is first made to FIG. 1, in which a serial slurry treatment system is generally designated by the numeral 10, as including a lime slaker 11, which may have a agitation device such as a mixer 12 therein, for delivering slaked lime via conduit 13, to a slurry tank 14. The lime slaker 11 may be of any desired type, such as the type disclosed in U.S. Pat. Nos. 2,904,401; 5,368,731; 4,261,953; 4,482,528, or of any other desired type.

The watery lime slurry is thus delivered from the slurry tank 14, which may have one or more mixers 15 therein, to be delivered via a delivery line, conduit, or pipe 16, by means of a pump, to a delivery line 18, then to a grit classifier 23 via delivery lines 20, 21 and 22, as shown in FIG. 1. During the delivery of lime slurry as described above, to the grit classifier 23, some of the lime slurry may be extracted via extraction line 24, in a controlled manner, with the control being provided via flowmeter 25 and control valve 26, to discharge via line 27, which may lead to the point of application of the lime slurry.

The grit removal or separation device 23 includes a tank 30, having a liquid level 31 therein, with a sloped auger, the lower end of which is immersed within the liquid level 31, and which operates to engage grit particles and convey them up the sloped surface 33, to a point of discharge 34, as shown.

The grit separation device 23 may be provided with a movable wall 35, controlled by a suitable electric or pneumatic actuator 36, for leftward and rightward movement, as shown, between the full line position 35 as shown, and a phantom line position 37, as shown, in order to vary the cross-sectional surface area, which will cause an automatic, continuous or intermittent variation in the volume of liquid 31 retained within the grit classifier 23.

The upper edge of grit classifier wall 38 provides a means for overflow of lime slurry from the grit classifier 23, via line 40, recirculating back into the slurry tank 14, as shown.

The pump 17 is selected in size, to provide a desired velocity through the conduit, pipe or delivery line 18, 20, 21, so that particles of lime and grit do not settle within such delivery line, pipe or conduit. The selected velocity of flow through the lines 18, 20, 21 also provides a scouring action from entrained grit which helps keep the same from clogging due to build-up of scale within the same.

It will thus be seen that the grit classifier 23, while acting via gravity removal of grit, allows a small quantity of grit to remain in the slurry to assist the scouring action of the slurry with some grit in it, for preventing build-up of lime scale within the system.

It will also be understood that the electric or pneumatic activator drive 36 for varying placement of the wall 35 can be operated continuously or automatically, as may be desired.

It will be seen, that in accordance with this invention, it is not necessary to add any dilution water to the lime slurry, such that the percentage of lime relative to water remains substantially constant.

It will also be apparent by the use of the flowmeter 25 and valve 26, the amount of lime being feed to discharge, such as the point of application, can be carefully controlled.

Figure 2:
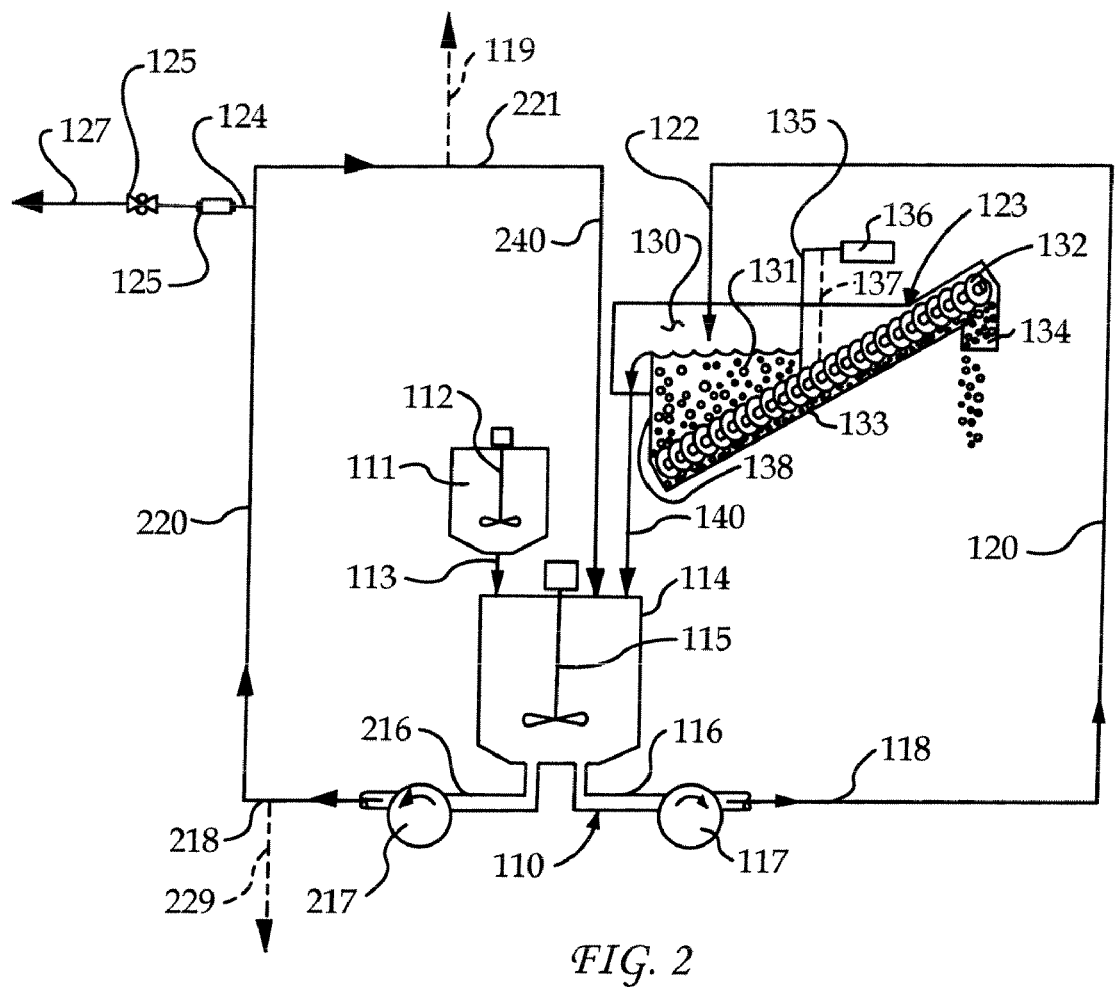
FIG. 2 is an illustration of a flow diagram, similar to that of FIG. 1, but wherein the withdrawal of slurry from the slurry tank to the point of grit separation and return to the slurry tank is in a parallel flow arrangement to the extraction of slurry from the system.

Referring to FIG. 2, the parallel loop system will now be described, with similar components to those illustrated in FIG. 1 operating in the same manner as such components are described above with respect to FIG. 1. The lime slaker 111 is may be provided with one or more agitation devices such as a mixer 112, for delivering slaked lime via conduit or delivery line 113 to the lime slurry tank 114. The lime slurry tank 114 is provided with one or more mixers 115 therein, suitable motor driven, as are those for the embodiment of FIG. 1, whereby some of the discharge from the slurry tank 114 is delivered via line 116, being pumped in the direction shown via pump 117, to delivery lines, conduits, pipes or the like 118, 120 and 121, to delivery line 122, into the gravity separation classifier 123, to form a liquid level 131 therein in the volume 130 thereof, such that grit can separate via gravity therein, for discharge via auger 132 up slope 133, to grit discharge location 134, as shown.

The recirculation of the slurry from grit classifier tank 123, over end wall 138, back to the slurry tank 114, via conduit or delivery line 140, is similar to that described above with respect to FIG. 1. Similarly, the automatic, continuous or intermittent variation in volume of liquid level 131 in separation classifier 123, by movement of the wall 135 from the full line position shown, to the phantom line position 137 shown, via wall drive mechanism 136, is similar to that set forth above with respect to FIG. 1.

Parallel to the flow from slurry tank 114 via pump 117 and conduit 118, 120, 121 and 122, is the flow via line 216 from the tank 114, as will now be described.

The pump 217 pumps the watery lime slurry from tank 114, via conduits or delivery lines 218, 220, 221 and 240, back into the tank 114. During the course of such recirculation, extraction can occur via line 124, controlled by flowmeter 125 and valve 126, to the point of application via line 127.

Figure 3:
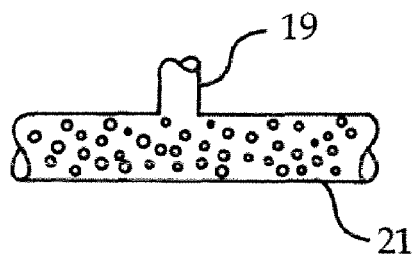
FIG. 3 is an enlarged detail view of the extraction of slurry from a delivery conduit, in a vertical upward direction.

With reference now to FIG. 3, it will be seen that the extraction of lime slurry from line 21 of FIG. 1 can be vertically upwardly, via extraction line 19, where it may be desired to minimize the extraction of grit particles. Such may be desirable for purposes as air pollution control, wherein upwardly from extraction line 19 (not shown), the lime slurry is sprayed through a nozzle into the air to be treated. In such situations, it can be desirable to avoid the tendency of grit particles to clog nozzles, and thus the extraction location 19 may be upwardly, as shown. Similarly, with respect to the embodiment of FIG. 2, the extraction can occur upwardly, via phantom extraction line 119. With respect to a vertical upward extraction, from the system shown in FIG. 2, such extraction can occur from line 221, via phantom line 119, similar to the extraction shown in FIG. 3 that is vertically upwardly, via line 19, from horizontal line 21.

Figure 4:
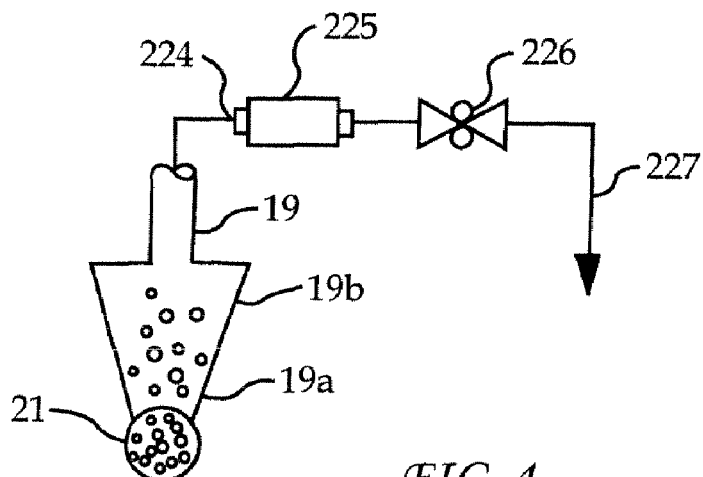
FIG. 4 is a detail view of the extraction of slurry from a slurry conduit, in a vertical upward direction, in which the cross-sectional size of the vertical upward conduit has at least a portion that is of greater cross-sectional size.

With respect to FIG. 4, from line 21, such extraction can likewise be vertically upwardly via line 19, but with line 19 having a predetermined cross-sectional diameter that varies from a lower end 19a thereof, to an upper end 19b thereof, with such cross-sectional size at the upper-most end further reducing the tendency for grit particles to travel upward via line 19, with the embodiment of FIG. 4 sufficing to slow the rate of rise of fluid therein, because of the upwardly increasing diameter, for the virtual illumination of any grit particles from passing upwardly via line 19. The extraction can then proceed via line 224, through flowmeter 225, through control valve 226 and via extraction line 227, to the point of application. It will be understood that the flowmeter 225 and valve 226 operate similarly to the operation of the flowmeter 25 and valve 26 illustrated in FIG. 1.

Figure 5:
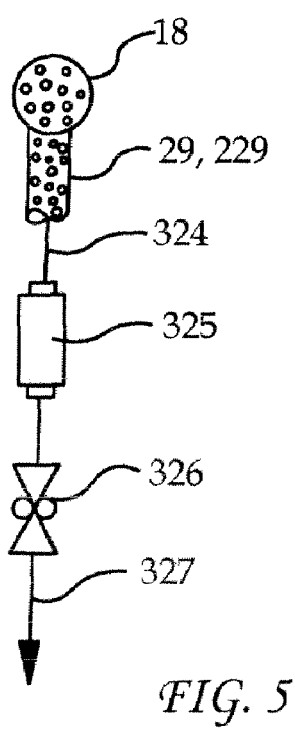
FIG. 5 is a detail view showing the extraction of slurry from the slurry discharge line via a vertical downward direction, for gravity extraction of grit along with the extraction of slurry.

With reference now to FIG. 5, it will be seen that the line 18 shown in FIG. 1, is illustrated in cross-section, as having a lime slurry, with grit therein, and that the discharge line shown in phantom at 29 in FIG. 1 is illustrated in FIG. 5, to illustrate an alternative withdrawal or extraction of lime slurry from the bottom of recirculation line 18, or alternatively via phantom extraction line 229 illustrated in FIG. 2, such that grit particles can be drawn off via extraction line 324 through flowmeter 325 and valve 326, via extraction discharge line 327, to the point of application. Such may be desirable where one may desire to scour scale build-up downstream of extraction lines 29, 229, as shown in FIG. 5.

It will also be apparent that the valves 26, 126, 226 and 326 can be controlled to be open partially, or fully; in the later case, should one desire to allow a flush of high velocity lime slurry to pass therethrough to the point of application, for providing a cleaning action.

With reference now to FIG. 6, it will be seen that various components of a slurry treatment system are indicated, having numerals that identify them by numerals that are similar in many cases to the numerals used in identification of components in FIG. 1, except that comparable numerals in the case of the system of FIG. 6 are of the 300 series, as distinguished from comparable elements in the system of FIG. 1, that are identified by numerals in the tens. Thus, the system 310 of FIG. 6 is generally designated as distinguished from the numeral 10 which designates the slurry treatment system of FIG. 1. Similarly in FIG. 6, the lime slaker is identified by the numeral 311, having a mixer 312 therein for delivering slaked lime via conduit 313 to a slurry tank 314 having a mixer 315 therein such that slurry is delivered via a conduit 316 by means of a pump 317 via lines 318, 320 and 321, and back through delivery line 322 to a tank 330 having a liquid level 331 therein, with a sloped auger in the tank 330, which operates to engage grit particles and convey them up a sloped surface 333 to a point of discharge 334 as shown.

The grit separation device 323 may be provided with a movable wall 335 controlled by a suitable actuator 336 for leftward and rightward movement, as shown, between the full line position 335 therefor and a phantom line position 337, as shown, in order to vary the cross-sectional surface area for causing an automatic, continuous or intermittent variation in the volume of liquid 331 retained within the grit classifier 323. Similarly, the upper edge of the grit classifier 338 provides a means for overflow of lime slurry from the grit classifier 323 via line 340, recirculating back into the slurry tank 314, as shown.

The pump 317 is likewise selected in size to provide a desired velocity via the lines 316, 318, 320. A discharge line is shown in phantom at 329, as an option, to illustrate an alternative withdrawal or extraction of lime slurry from the bottom of recirculation line 318 in the event that one may desire to scour scale build-up downstream of extraction line 329.

Also, optionally, if desired, an extraction can occur similar to that via line 24 as shown in FIG. 5, through a flowmeter similar to that 25 of FIG. 1 and control valve similar to that 26 of FIG. 1, if desired.

In the embodiment of FIG. 6, slurry can be withdrawn via line 351, which operates from suction provided through line 352 from suction pump 353 to a discharge line 354. The suction line 351 is located in a preferably round cross-sectional, pipe-like stilling well 350, the bottom of which extends lower into the liquid level "L" of slurry in the tank 314 than the bottom of suction line 351.

With specific reference to the enlarged detail view of a portion of the illustration of FIG. 6, that is present in FIG. 7, it will be seen that the stilling well 350 has a cross-sectional area determined by a diameter D1, which is selected to have a predetermined flow velocity responsive to the suction drawn via pump 353 such that there is a sufficient residence time for slurry entering the bottom of the stilling well 350, at level H1, to allow for gravity separation of grit "G" from the slurry in the tank 314, prior to a portion of that slurry entering the suction line 351, the mouth of which is at level H2 within the stilling well 350. Thus, between the suction created via pump 353 and the cross-sectional area of the stilling well 350, the rise rate of slurry in the stilling well is controlled such that a desirable percentage of, or all grit particles do not reach the lower end of the suction line 351. This is because the velocity of flow from the stilling well is determined by the rate of flow divided by the cross-sectional area of the stilling well 350.

It will be understood, by reference to the phantom illustration at the right side of FIG. 7, that the stilling well could be located outside the slurry tank 314, as is the phantom illustrated stilling well 450 of FIG. 7, connected thereto via a connection line 453, which allows slurry from inside the tank 314 to enter the bottom of the stilling well 450, prior to rising to the point of entry H2 at a predetermined level within the stilling well 450, to enter the suction line 451 and to be withdrawn therefrom via phantom suction line 452, similar to that of line 352 of the full line illustration of FIG. 7, as the same is drawn via a suction pump (not illustrated) for the phantom stilling well illustrated at the right end of FIG. 7.

Referring now to FIG. 8, it will be seen that a slurry tank 514 is provided similar to that of the slurry tank 314 of FIG. 7, and wherein agitation is provided via an impeller in the tank 514, for agitation of a slurry disposed therein at level "L". However, with respect to FIG. 8, it will be seen that the preferably round cross-sectional, pipe-like stilling well 550 is shown having a larger cross-sectional area as indicated by a larger diameter D2 therefor, whereby liquid entering the stilling well 550, being subjected to a suction provided by the suction pump 553 for delivery to a discharge line 554 will create a reduced flow velocity for the system of FIG. 8, relative to that for the system of FIG. 7, at the lower end of the stilling well 550. Thus, liquid entering the bottom of suction line 551 at height H2 after passing into the stilling well via its bottom at level H1, will have an even greater residence time at the bottom of the stilling well 550, than the residence time of liquid entering the bottom of the stilling well 350 of FIG. 7, with the reduced flow that creates such residence time giving a greater amount of time for grit "G" to settle out of the slurry in the tank 514.

In both of the embodiments of FIGS. 7 and 8 it will be seen that lime slakers 311, 511, respectively can provide lime to the slurry tanks 314, 515, respectively, via their respective delivery lines 313, 513.

Also, it will be noted that in FIGS. 9 and 10 a means is optionally provided for adjusting the cross-sectional area of the stilling well in the form (for example only) of a pneumatic or other drive means, for altering the cross-sectional area of the stilling well 652, by movement of one or more walls thereof as shown at the upper end of the stilling well 652, so that the flattened walls 653, 654 thereof can slide relative to each other between the full line and phantom line illustrations therefor, outside the slurry withdrawal line 651.

It will be apparent from the foregoing that various modifications may be provided, in the details of construction of an apparatus in accordance with this invention, as well as in the use and operation thereof, all within the spirit and scope of the invention as defined in the appended claims. It will further be understood that where features of this invention are recited in the "means plus function" terminology, it is intended that they embrace all means capable of providing such function in addition to the representative embodiments described and illustrated, unless otherwise specifically limited herein.

What is claimed is:

1. A method of treating lime slurry in a slurry treatment system, comprising the steps of:
   (a) providing a watery lime slurry having lime particles and grit particles therein, in a slurry tank;
   (b) delivering slurry from the slurry tank and extracting a portion of the slurry delivered from the slurry tank via a discharge line and discharging said extracted portion of the slurry from said discharge line;
   (c) substantially continuously delivering the slurry from the slurry tank to a device for separation of some of the grit from the rest of the slurry; and
   (d) recirculating the rest of the slurry to the slurry tank after separation of some of the grit from the slurry; and
   (e) wherein the extraction of clause (b) is via a suction line, through a stilling well, that allows gravity separation of grit from slurry.

2. The method of claim 1, wherein the substantially continuously delivering step includes delivering the slurry to a gravity-operative grit classifier device for separation of some of the grit from the rest of the slurry, via gravity grit separation.

3. The method of claim 1, including the step of selecting the cross-sectional area of the stilling well depending upon the rate of flow of slurry extracted from the slurry tank via the discharge line, to achieve a desired predetermined velocity of flow through the stilling well.

4. The method of claim 3, including the step of adjusting the cross-sectional area of the stilling well to change the flow velocity through the stilling well and the residence time of slurry in the stilling well.

5. The method of claim 1, wherein the extraction step of clause (b) occurs through a stilling well located in the slurry tank.

6. The method of claim 1, wherein the extraction step of clause (b) occurs through a stilling well located outside of, but connected via a liquid lines to the slurry tank.

* * * * *